July 10, 1962 F. J. ABRAHAM 3,043,367
GAS TURBINE ENGINE FUEL SUPPLY CONTROLS
Filed Dec. 27, 1954 3 Sheets-Sheet 1
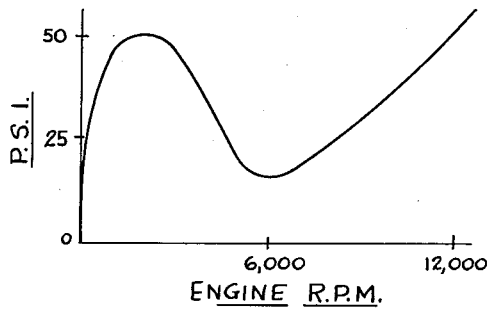
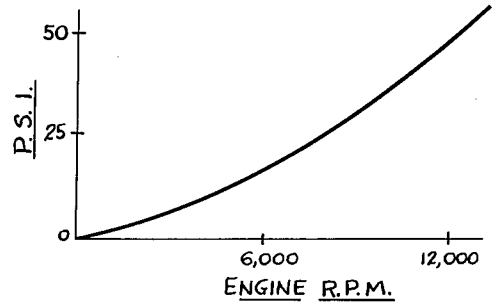
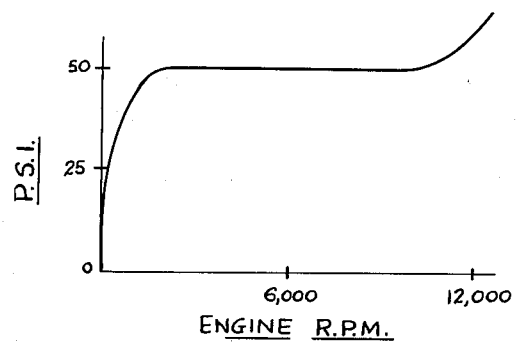
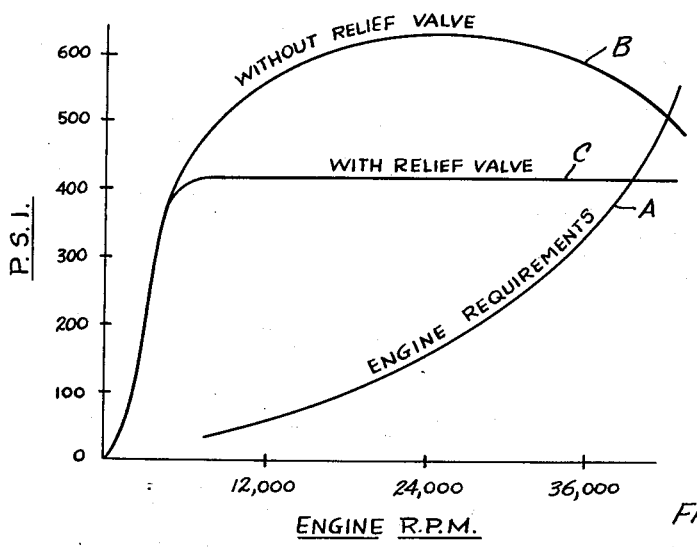
INVENTOR.
FRANK J. ABRAHAM
BY
Reynolds, Beach & Christensen
ATTORNEYS July 10, 1962  F. J. ABRAHAM  3,043,367
GAS TURBINE ENGINE FUEL SUPPLY CONTROLS
Filed Dec. 27, 1954  3 Sheets-Sheet 2
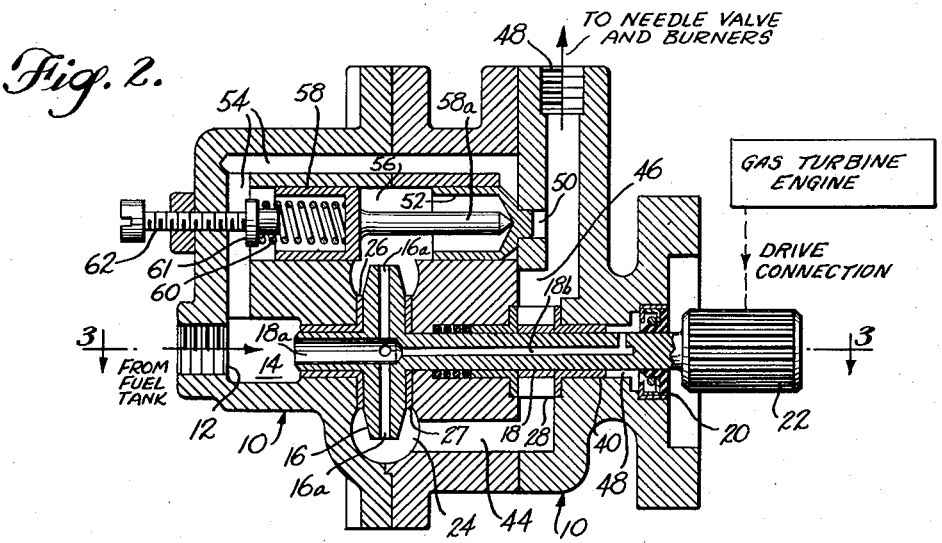
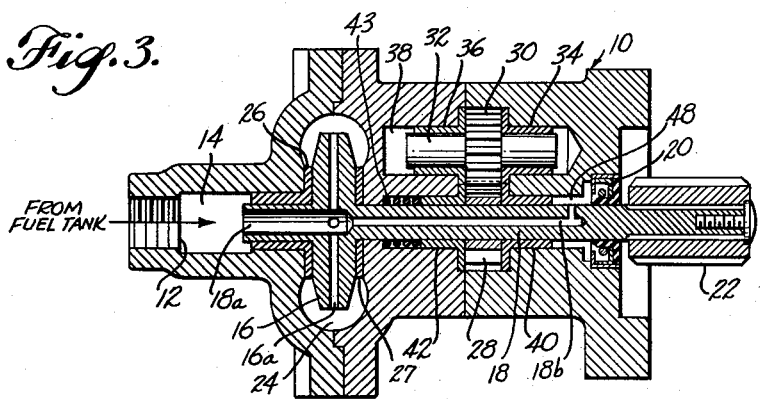
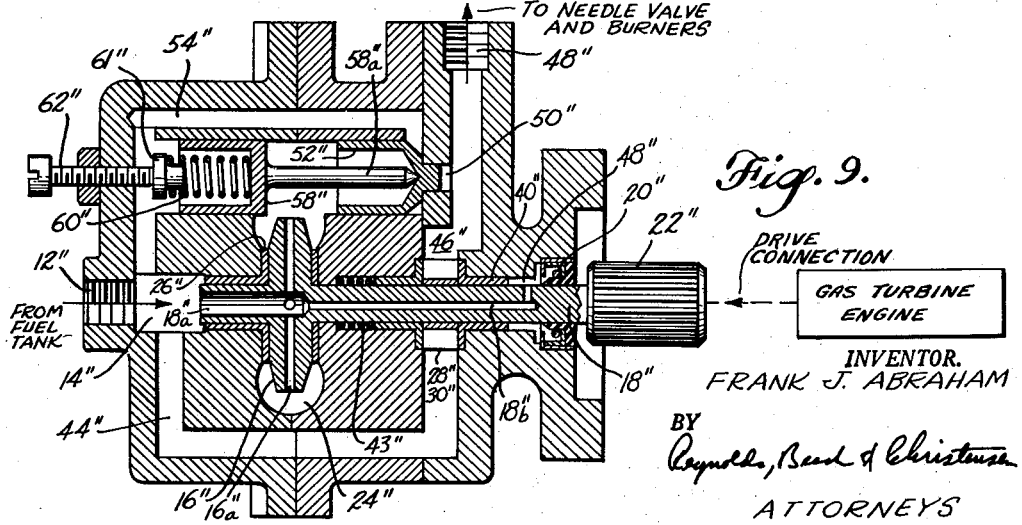
INVENTOR.
FRANK J. ABRAHAM
BY
Reynolds, Beard & Christensen
ATTORNEYS July 10, 1962　　　F. J. ABRAHAM　　　3,043,367
GAS TURBINE ENGINE FUEL SUPPLY CONTROLS
Filed Dec. 27, 1954　　　3 Sheets-Sheet 3

INVENTOR.
FRANK J. ABRAHAM
BY
Reynolds, Beech & Christensen
ATTORNEYS

United States Patent Office 3,043,367
Patented July 10, 1962

3,043,367
GAS TURBINE ENGINE FUEL SUPPLY CONTROLS
Frank J. Abraham, Seattle, Wash., assignor to Boeing Airplane Company, Seattle, Wash., a corporation of Delaware
Filed Dec. 27, 1954, Ser. No. 477,851
12 Claims. (Cl. 158—36.4)

This invention relates to a novel and improved apparatus for controlling the delivery of fuel to gas turbine engines and is herein illustratively described by reference to its presently preferred form intended for application to automotive gas turbine engine. It will be recognized, however, that the essential features and principles comprising the inventive subject matter are not necessarily restricted to the illustrated details and embodiment.

My earlier Patent 2,631,658, granted March 17, 1953, entitled "Engine Speed Regulating Fuel Supply Control," discloses use of a centrifugal pump in the fuel supply of a turbojet engine. It is found that the output pressure vs. speed characteristic of a centrifugal pump driven by a gas turbine engine closely approximates the fuel requirements of such an engine. However, reliance on a centrifugal type pump as the primary or sole fuel pump for a gas turbine engine has certain disadvantages which tend to offset the advantages of a continuously variable pressure characteristic approximating the engine fuel requirements.

One disadvantage of a centrifugal fuel pump for a gas turbine engine is the relatively high viscous drag encountered in a pump capable of producing the required flow rates and pressures. The result is excessive power loss. A second disadvantage is the considerable size and weight of a pump having sufficient capacity for the engine. Moreover, a centrifugal pump cannot draw and start flow of fuel from a source arranged lower that itself. Further, with some gas turbine engines a relatively high surge of fuel is required in starting the engine which is beyond the delivery rate of a centrifugal pump having a pressure vs. speed characteristic otherwise suited to the operating requirements of the particular engine.

In substantially positive displacement type pumps such as gear pumps it is not practically possible to tailor the pressure-speed characteristic of the pump to the engine fuel requirements. In such cases even slight dimensional discrepancies or changes in the moving elements, i.e. the gear teeth, such as changes caused by slight wear, have a marked effect on pump output pressure. Moreover, if the engine fuel nozzle is changed or the type of fuel is changed the pressure vs. speed characteristic of a gear pump is materially affected.

A general object of the present invention is a fuel supply control overcoming and avoiding the above shortcomings and disadvantages in an effective manner while efficiently utilizing the desirable pressure vs. speed characteristic of a centrifugal type pump for matching the dynamic fuel requirements of a gas turbine engine. More specifically it is an object to provide an improved fuel supply control combining the advantageous features of a centrifugal type pump and those of a positive displacement type pump such as a gear pump for offsetting the deficiencies of a centrifugal pump.

Another object is a compact, lightweight, efficient, simple and reliable fuel supply control for turbojet engines and other gas turbine engines, said control being adaptable for use either with manual or with automatic regulation of engine speed. A related object is such a fuel pump or control which consumes relatively little drive power even at full operating speed of the engine.

A more specific object of the invention is a combined gear pump and centrifugal pump regulating the operation of the gear pump and so arranged in relation thereto that the usual problem of cavitation of the fuel in the gear pump is overcome so that the latter can operate satisfactorily at very high speeds encountered in gas turbine engines.

In one illustrated form of the invention the novel control includes a relatively small and compact centrifugal pump cooperatively arranged with a gear pump as the primary fuel pressure source to achieve the above-mentioned objectives. A pressure relief valve situated in a by-pass around the gear pump is variably opened by actuating means preferably comprising piston means such as the valve element itself subjected to the oppositely acting forces of gear pump pressure and centrifugal pump pressure, thereby causing fuel pressure delivered by the gear pump to vary in accordance with engine speed requirements as established by the dynamic pressure vs. speed characteristic of the centrifugal pump. Preferably the centrifugal pump is positioned in the fuel line ahead of the gear pump so as to supercharge the gear pump and thereby avoid cavitation difficulties even at relatively high speeds. In the illustrated case both such pumps and the relief valve and associated actuating mechanism are operatively arranged within the same compact housing requiring only a single fuel line to deliver fuel to the same and a single fuel line to deliver fuel from the same to the engine nozzles.

In certain instances, where relatively high initial fuel pressure is required in starting a gas turbine engine, the relief valve is maintained closed against the effects of centrifugal pump pressure by means of a spring device, and is opened by a sufficient increase of such pressure acting on a spring deflecting piston element. As a result, the fuel pressure delivered to the engine during starting is a function of the unmodified dynamic pressure vs. speed characteristic of the gear pump until a predetermined speed is reached, whereupon centrifugal pump pressure becomes sufficient to overcome the action of the spring device and thereafter places the relief valve directly under control of centrifugal pump pressure so that the actual pressure of fuel delivered to the engine becomes that established by the dynamic pressure vs. speed characteristic of the regulatory centrifugal pump.

In addition to the advantages enumerated above for the novel fuel supply control, the same may be readily designed for acceleration limiting and, if desired, for automatically limiting speed of the engine at a predetermined maximum. In one illustrated and preferred embodiment the control housing incorporates automatic speed regulating means including a flow restricting valve interposed in the output line from the gear pump and actuated to establish a variable flow restriction in such line in accordance with the varying position of a valve actuator including a piston subjected to centrifugal pump pressure and a spring acting on the piston in opposition to such pressure.

These and other features, objects and advantages of the invention will become more fully evident from the following description thereof by reference to the accompanying drawings.

FIGURE 1 is a graph illustrating gas turbine engine fuel pressure requirements and the associated pressure vs. speed characteristics of certain conventional governor controlled pumps.

FIGURE 2 is a transverse sectional view of the fuel supply control in its basic preferred form.

FIGURE 3 is a sectional view of the same control taken on line 3—3 in FIGURE 2.

FIGURE 4 is a graph illustrating the dynamic pressure vs. speed characteristic of a centrifugal pump, which is that of the presently improved fuel supply control as shown in FIGURES 2 and 3 with a modification.

FIGURE 5 is a graph showing the dynamic pressure characteristics of the improved fuel supply control of FIGURES 2 and 3 with a particular relationship between the diameter of the spring device piston and the relief valve-piston both of which are subjected to centrifugal pump pressure.

FIGURE 6 is a similar graph with a relatively larger diameter spring device piston.

FIGURE 9 is a transverse sectional view of a modified form of the fuel supply control shown in FIGURES 2 and 3, with a different arrangement of the centrifugal pump and the gear pump in relation to the path of flow through the mechanism.

Figure 7:
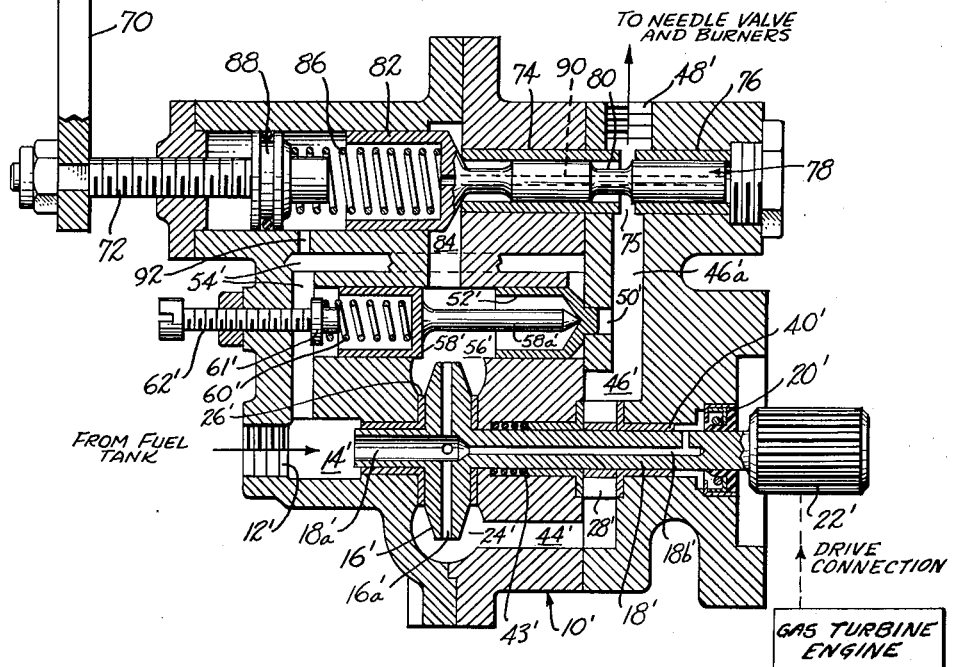
FIGURE 7 is a transverse sectional view of the improved fuel supply control with automatic engine speed governing provisions incorporated in the fuel supply control housing.

Referring to FIGURE 1, curve A illustrates the variation of required fuel pressure for a gas turbine engine as a function of speed. In the example idling speed of the particular engine was about 12,000 r.p.m. and operating speed for development of full power about 36,000 r.p.m. It will be noted that required fuel pressure increases approximately as the square of speed. Curve B illustrates the pressure characteristics of a conventional gear pump operated without a relief valve, and curve C represents the pressure characteristic of such a pump operated with a relief valve. A common type of fuel supply control is made up of a gear type fuel pump with a relief valve and a flyball governor, such as in the "Woodward" system of fuel supply governing. In that system the governor action reduces pump output pressure by the necessary amount for producing a particular engine speed for each setting of the needle valve under assumed load conditions. Such a speed control mechanism, however, employing a number of moving parts, is subject to possible mechanical failures and can be influenced to a certain extent by shock, vibration and acceleration effects encountered in high speed jet airplanes and similar installations. Moreover, cavitation losses at high operating speeds reduce the volumetric efficiency of the gear pump.

Referring to FIGURES 2 and 3, the casing 10 for the improved fuel supply control has an inlet port 12 threaded to form a connection to the supply line leading from the fuel tank (not shown). Liquid fuel drawn through the port 12 enters the suction chamber 14. The centrifugal pump disk 16 is mounted on a driven shaft 18, one end of which passes through a suitable fluid-tight seal 20 and projects through the end of the casing 10 and has a pinion gear 22 by which such shaft is rotated through suitable gearing by the shaft of the gas turbine engine (not shown). The opposite end of the driven shaft 18 extends beyond the centrifugal pump disk 16 to the suction chamber 14 and is provided with an axial bore 18a through which liquid fuel is drawn from the suction chamber to the core of the centrifugal pump rotor 16. The centrifugal pump rotor 16 has a plurality of radial bores 16a extending from its rim to the central feed passage 18a therein so that as the centrifugal pump rotor 16 rotates the centrifugal force acting on the fuel in these radial passages produces a fuel pressure in the centrifugal pump plenum chamber 24 substantially proportional to the square of the rotational speed of the driven shaft 18. The inner end portion of the driven shaft 18 and the centrifugal pump rotor 16 carried thereby are positioned by journal elements 26 and 27, the former of which provides a seal preventing leakage from the centrifugal pump plenum chamber 24 to the suction chamber 14.

Fixed on the driven shaft 18 is one gear 28 of a gear pump incorporated within the control housing 10. The second gear 30 of this gear pump is carried by a counter shaft 32 journaled by antifriction sleeve bearings 34 and 36 in a bore 38 formed in the housing parallel to the shaft 18 as illustrated (FIGURE 3). The sleeve bearings 34 are flanged and the flanges contact opposite sides of the gear 30 to maintain the same centered in the space provided for it in the housing 10. Similar sleeve bearings 40 and 42 surrounding the driven shaft 18 and contacting respectively opposite sides of the gear 28 maintain the latter properly centered in the chamber provided for it, as shown. A compressed helical spring 43 encircling shaft 18 maintains close contact between gear 28 and adjacent bushings 40 and 42. A similar spring (not shown) is preferably used with gear 30. Thus end wear of the bushings does not impair volumetric efficiency of the gear pump.

The input side of the gear pump comprising gears 28 and 30 receives liquid fuel from this centrifugal pump plenum chamber 24 through the passage 44. The gear pump plenum chamber 46 leads to the control outlet port 48 which is threaded for connection to a fuel supply line leading to the needle valve (not shown) and engine burner (not shown). Between the sealing means 20 and the sleeve bearing 40 there is an annular space 48 in which any leakage fuel may collect which escapes past the sleeve bearing 40 due to the pressure developed by the gear pump. This leakage accumulation is drawn by centrifugal pump suction from the chamber 48 through an axial bore 18b having a radial branch in the driven shaft 18, which bore extends to the core of the centrifugal pump.

A port 50 is formed in one wall of the gear pump plenum chamber 46. A cup-shaped relief valve 52 normally closes this port against leakage of fuel from the gear pump plenum chamber into the by-pass 54 which leads from the port 50 back into the suction chamber 14. The tip of the cup-shaped, piston type relief valve 52 which enters the port 50 presents a piston face to the high pressure fuel in the gear pump plenum chamber 46. The effective area of this piston face is a small fraction, such as one-seventh the effective area of the opposite end portion of the relief valve 52, which in turn is exposed to the pressure of fuel in a cylindrical guide bore for the valve element communicating with the centrifugal pump plenum chamber 24, as shown. Thus, the pressure developed by the centrifugal pump 16 urges the piston-valve element 52 toward closed position, whereas the gear pump pressure in port 50 urges such valve element toward open position. In effect, therefore, this valve limits the pressure which may be developed in the gear pump plenum chamber 46 to a valve approximately equal to the pressure in the centrifugal pump plenum chamber 24 multiplied by the ratio of the respective areas of the opposite end faces of the piston-like valve element 52.

The mechanism shown in FIGURES 2 and 3 may include, and preferably does include for many applications a spring device which actuates the piston-valve 52 to its closed position normally, and until centrifugal pump pressure reaches a predetermined value during increase of pump speed, as during starting of the associated gas turbine engine. Such a spring device comprises the cuplike piston element 58 slidably received in the bore 56 with its open end directed away from the piston valve 52 to receive a helical spring 60 therein. This spring is supported by and reacts against the collar of a stationary support 61 which is mounted on the end of a machine screw 62 for adjustable positioning lengthwise of the bore 56. The opposite end of the cup-like member 58 carries a plunger 58a which projects axially into the interior of the piston-valve 52 to contact the inside end face thereof and hold the valve element in closed position under the compression force in the spring 60.

The operation of the fuel supply control shown in FIGURES 2 and 3 may be explained by first assuming that the spring device comprising spring 60, piston 58 and plunger 58a is removed or has no effect on the piston-valve 52, which is actually the case in certain installations wherein the spring device is not required for providing an extra surge of pressure during starting of the gas turbine engine. Under these assumed conditions, as the gas turbine engine starter increases the rotary speed of the engine, hence of the driven shaft 18, the gear pump 28, 30 creates a substantial negative pressure in the suction chamber 14, drawing fuel through the port 12 from the fuel tank even though the tank may be at a lower elevation than the suction chamber, and without need for a separate booster pump. This capability of drawing the fuel initially from a lower level is characteristic of a positive displacement pump such as the gear pump but is not characteristic of the centrifugal pump which is incapable of drawing liquid through a head unless initially primed to do so. Thus the fuel supply control including the combined gear pump and the centrifugal pump is self-priming. The pressure increase in the gear pump plenum chamber 46 has a tendency to take place at a faster rate proportionally than the pressure increase in the centrifugal pump plenum chamber 24. In a practical case the pressure increase from the gear pump as a function of engine speed is materially greater than the fuel pressure requirement of the engine. However, the pressure increase of the centrifugal pump is substantially directly proportional to the fuel pressure requirements of the engine, and differs therefrom by a proportionality factor represented in the ratio of the respective areas of the opposite end faces of the piston-like relief valve 52 subjected to centrifugal pump pressure and gear pump pressure respectively. Thus, the actual pressure increase in the gear pump plenum chamber 46, representing the fuel pressure delivered to the needle valve controlling passage of fuel to the engine burners, is determined by the dynamic pressure vs. speed characteristic of the centrifugal pump 16. Any tendency for the gear pump pressure to rise above the desired value results automatically in greater opening of the relief valve 52 and flow of fuel in the by-pass passage 54, back to the suction chamber 14. The resulting dynamic pressure characteristic of the fuel supply control shown in FIGURES 2 and 3 is therefore as illustrated in FIGURE 4, which closely approximates the fuel supply requirements of the engine.

Actually it is desirable that the fuel supply control pressure curve lie slightly above and extend substantially parallel to the actual fuel pressure requirements of the engine to afford a desired limited rate of acceleration. The greater the separation between these curves, the greater the obtainable rate of acceleration of the engine at any given speed.

It will be recognized that while the centrifugal pump in FIGURES 1 and 2 is required to pass the same volumetric flow of fuel as the gear pump, the centrifugal pump need not develop more than a small fraction of the required fuel pressure in the output side of the fuel supply control. Thus, the centrifugal pump may be made relatively small in size, and since the radial passages of this pump can be made relatively short there is relatively little viscous drag in the centrifugal pump. The gear pump itself is an efficient mechanism. Consequently, the over-all volumetric efficiency of the combined pumps operating in the fuel supply control is very high. By way of comparison the improved control illustrated in FIGURES 2 and 3 for a particular gas turbine engine can be made to operate on about one-fourth horsepower, whereas a comparable control using only a centrifugal pump requires from three to four horsepower, at the same engine speed in the two instances.

Another and distinct advantage of the combined centrifugal pump and gear pump or other positive displacement pump fuel supply control arranged as in FIGURES 2 and 3 is that the centrifugal pump has a unique advantage in the upper speed range, whereas the gear pump has a unique advantage during starting. It has been mentioned that the gear pump causes the fuel supply control to be self-priming during starting even though the source of fuel is at an elevation considerably lower than the control itself. In the upper speed range the gear pump has a tendency to lose its ordinarily high volumetric efficiency due to cavitation effects. This effect in a conventional gear pump installtion apparently results from the fact that the atmospheric pressure forcing the liquid into the gear pump is insufficient at high volumetric rates of flow and the turbulence in the liquid creates small voids and gas bubbles at the intake side and in the meshing gears of the pump. However, with the centrifugal pump positioned in the fuel line ahead of the gear pump a supercharging of the gear pump takes place which is sufficient to prevent cavitation or at least to extend the operating speed range obtainable before cavitation becomes serious. Thus, the combined pumps operating as disclosed not only yield a wider speed range in which the fuel supply control can operate efficiently, but enables the system to be self-priming without necessity of any additional booster pumps or the like. No external piping is required beyond the input and output lines since the entire mechanism may be held compactly within a unitary casing.

The effect of the spring device 60, 58, 58a will now be explained. With some engines it is desirable that the fuel supply pressure to the burner nozzle rise almost immediately to a substantial pressure and remain at that pressure until the engine reaches idling speed or a low operating speed and is fully started, whereupon the fuel pressure delivered by the fuel supply control should closely approximate the normal operating speed requirements of the engine. The resultant required pressure variation in one type of engine is illustrated by the graph in FIGURE 5. This result is achieved by the addition of the spring device. The compression force of spring 60 holds the relief valve 52 closed as the speed of shaft 18 progressively increases from zero. The pressure in gear pump plenum chamber 46 therefore rises rather abruptly with increase of speed until such pressure acting on the tip of piston valve 52 equals the force of the spring, whereupon further increase of such pressure is retarded and subsequently stopped by flow of liquid past the valve and through the by-pass 54. Thereupon gear pump plenum chamber pressure remains substantially constant during further and progressive increase of shaft speed. Finally a speed is reached at which pressure in the centrifugal pump plenum chamber 24 acting on piston member 58 becomes sufficient to overcome the force of the spring 60 and force the plunger 58a out of contact with the piston valve 52. When this occurs the piston valve 52 becomes controlled solely by the difference in pressure between the centrifugal pump plenum chamber and the gear pump plenum chamber and the latter pressure is permitted to increase along a substantially parabolic curve representing the characteristic of the centrifugal pump, hence the fuel pressure requirements of the engine.

It will be apparent that various types of pressure vs. speed characteristics may be obtained by adjustment of screw 62 which establishes the initial loading of the spring 60, hence the pressure at which the curve of FIGURE 5 levels off during starting conditions. Furthermore, the characteristic curve of pressure as a function of speed in the illustrated system can be varied by varying the size of the spring-loaded piston 58. The illustration in FIGURES 2 and 3 shows the piston 58 as having the same outside diameter as the piston valve 52, resulting in a characteristic curve similar to that illustrated in FIGURE 5. If the piston 58 is made larger in diameter than the maximum diameter of the relief piston-valve 52, it is possible for the centrifugal pump pressure to overcome the effect of the spring 60 sooner during speed increase and provide an operating characteristic such as that illustrated in FIGURE 6. With such an arrangement the necessary surge of high pressure for efficient starting of a gas turbine engine with a simplex nozzle is obtained. Moreover, such an arrangement helps to insure effective cross-firing characteristics without development of excessive heat during engine starting.

If, on the other hand, the engine has an ignition system insuring two-burner starting without a crossfire tube (or in engines equipped with single burners) the piston 58 and spring 60 may be removed entirely from the fuel supply control so that the output pressure from the control mechanism will follow the characteristic curve established by the centrifugal pump alone, thereby insuring low temperature starting with by-pass nozzles in the engine. Such a characteristic curve would be similar to that shown in FIGURE 4.

It will be evident that in applications or jet turbine engines to ground vehicles such as automobiles where continuous full throttle operation is not to be expected normally, reliance can be placed on a fuel supply control arrangement in which the output pressure vs. speed characteristic of the control will intersect the fuel supply pressure requirement characteristic of the engine and thereby limit top speed of the engine. In such a case a simple needle valve operated by the driver and placed in the line between the fuel supply control and the engine could provide all the necessary speed control over the engine.

Figure 8:
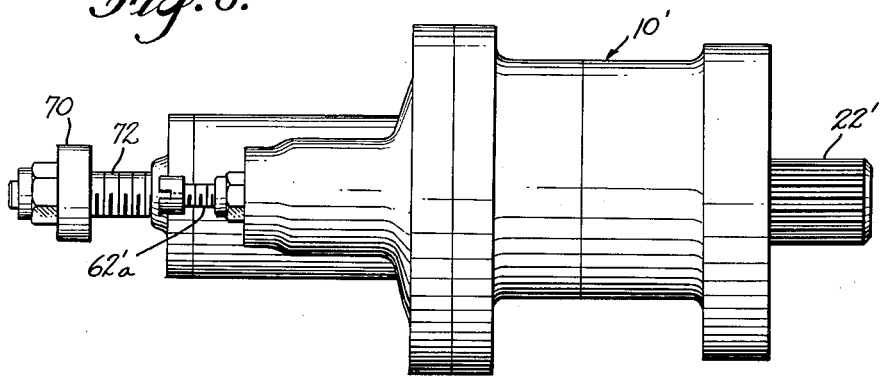
FIGURE 8 is a side view of the control shown in FIGURE 7.

However, in cases wherein it is desired to maintain speed substantially constant at an efficient value, it may be desirable to employ a full governing type of control such as that shown in FIGURES 7 and 8. Such an arrangement is particularly useful, for example, in truck operation in hilly country or in prime movers for electrical alternators or air compressors wherein a variable load is presented. In such situations it is inconvenient or impracticable to place the entire control in the hands of a person.

In FIGURES 7 and 8 parts which correspond generally to those described and shown in FIGURES 2 and 3 are labeled with similar reference numerals primed. In this modified arrangement the control mechanism housing 10' is enlarged to incorporate not only the centrifugal pump, gear pump, relief valve and associated spring device actuating the relief valve, but also an automatic speed regulating governor mechanism of the spring-actuated piston type. No needle valve between the fuel supply control and the engine burner is necessary in this case since the manual setting of speed may be effected by means of a throttle arm 70 fixed on the outer end of the feed screw 72. An outlet passage 46'a interconnecting the gear pump plenum chamber 46' and the outlet port 48' is intersected by a transverse bore in the casing 10' which receives the aligned valve guide tubes 74 and 76 fixed therein with a slight gap 75 formed between their adjacent ends, in the passage 46'a. Fuel flowing through this passage and out the port 48' must pass through this gap. The gap 75 is closed by varying amounts in accordance with the positioning of the regulating valve 78 having land portions slidably received in the respective tubes 74 and 76 and an intermediate neck portion 80 of reduced diameter. The valve 78 is connected to a cup-like piston 82, one end of which is subjected to pressure in the centrifugal pump plenum chamber 24' through a passage 84. The opposite end or cavity of the piston member 82 receives one end of the spring 86 whose opposite end seats against the adjustable stop 88 carried by the inner end of the feed screw 72. The arrangement is such that pressure from the centrifugal pump tends to force the valve 78 closed across the gap 55 whereas pressure of the spring 86 raises the valve toward open position. A small axial bore 90 extending through the length of the valve and piston assembly, and a bore 92 in the casing between the by-pass 54' and the cylindrical cavity in which the piston 82 is guided, draws any fuel leaking past the valve land 76 back into the suction side of the centrifugal pump.

In operation, the rotated position of the throttle arm 70 about the axis of feed screw 72 establishes the axial position of the spring stop 88, hence the initial loading in the spring 86. At the correct operating speed of the engine for this particular setting of the throttle arm the valve 78 will assume a given position and permit a certain flow of fuel through the opening 75 and out the port 48' to the engine burners. Should the engine load suddenly drop and permit a temporary increase in engine speed, the resulting increase in centrifugal pump plenum chamber pressure will force the piston 82, hence the valve to the left in the figure and reduce the opening through gap 75. This cuts down the flow of fuel to the engine and thereby reduces the engine speed. Likewise, a sudden decrease in engine speed, as when load is suddenly increased, will cause a corrective adjustment in the position of the piston 82 against the force of spring 86, hence permit an increased flow of fuel to the engine through the gap 75. Thus the mechanism in addition to incorporating the features already described and illustrated in connection with FIGURES 2 and 3 provides for full speed control governing action in an integrated compact control arrangement.

In FIGURE 9 there is illustrated a modification of FIGURES 2 and 3, wherein the centrifugal pump 16" instead of being serially arranged with the gear pump 28', 30' is not positioned in the direct line of flow of liquid fuel through the control mechanism. Instead, the sole function of the centrifugal pump is to provide the speed control pressure acting on the back side of the piston valve 52". In this case the input side of the gear pump 28", 30" is connected directly to the suction chamber 14" through the passage 44", as shown. Thus while the mechanism shown in FIGURE 9 has most of the operating characteristics of the previous form, it lacks the advantage of supercharging the gear pump to minimize the effects of cavitation in the upper speed range of the engine with which the mechanism is associated. The various parts and the details of that operation in FIGURE 9 need not be described in further detail since parts which correspond to those in FIGURES 2 and 3 are designated with similar numerals bearing a double prime superscript.

I claim as my invention:

1. Fuel supply control means for a gas turbine engine comprising means forming an inlet passage to receive liquid fuel at relatively low pressure from a supply source, means forming an outlet passage to discharge fuel at relatively high pressure for consumption in the engine, positive displacement fuel pump means interposed operatively between said inlet and outlet passage to raise the pressure of fuel passing therebetween, means forming a by-pass between said inlet and outlet passages, relief valve means controlling flow through said by-pass by variable positioning of said valve means to regulate fuel pressure developed in said outlet passage, and centrifugal pump means having an inlet communicating with said inlet passage and having an outlet, said positive displacement pump means and said centrifugal pump means being adapted to be driven substantially proportionally to gas turbine engine speed, said relief valve means including differential pressure responsive means subjected to outlet passage pressure for urging said relief valve in the sense to open said by-pass and to centrifugal pump outlet pressure for urging said relief valve in the sense to close said by-pass progressively with increase of centrifugal pump outlet pressure, said pressure responsive means being adapted to control positioning of said relief valve in response relatively to said outlet passage pressure and centrifugal pump outlet pressure for varying said outlet passage pressure substantially in proportion to variations of centrifugal pump outlet pressure over at least a material portion of the speed range of a gas turbine engine driving said two pump means.

2. The fuel supply control means defined in claim 1, wherein the centrifugal pump means is serially interposed with the positive displacement pump means between the inlet and outlet passages and is positioned ahead of said positive displacement pump means for supercharging the same at high speeds of rotation thereof.

3. The fuel supply control means defined in claim 2, wherein the relief valve means further includes a spring device having a spring element, an actuating element subjected to pressure of said spring element and arranged to press the relief valve toward closed position, and a pressure responsive element also connected to said actuating element and subjected to pressure in the centrifugal pump outlet to move said actuating element in opposition to said spring element, whereby during speed increase the force of said spring element is overcome upon attainment of a predetermined speed.

4. The fuel supply control means defined in claim 1, wherein the relief valve means further includes a spring device having a spring element, an actuating element subjected to pressure of said spring element and arranged to press the relief valve toward closed position, and a pressure responsive element also connected to said actuating element and subjected to pressure in the centrifugal pump outlet to move said actuating element in opposition to said spring element, whereby during speed increase the force of said spring element is overcome upon attainment of a predetermined speed.

5. The fuel supply control means defined in claim 4, wherein the positive displacement pump means comprises a gear pump rotatively coupled to the centrifugal pump means.

6. Apparatus for controlling supply of fuel to a gas turbine engine comprising, in combination, fuel pump means operatively arranged to be driven by the engine and to supply liquid fuel to such engine, said pump means having an inherent pressure versus speed characteristic materially exceeding the engine's fuel supply requirements, means forming a by-pass around said pump means, and pressure-relief means operatively controlling flow through said by-pass and adapted to vary pressure of said pump means thereby substantially in proportion to the square of the speed at which said pump means is driven, said pressure-relief means comprising a centrifugal pump operatively arranged to be driven by the engine to produce liquid pressure substantially proportional to the square of the speed by which said centrifugal pump is driven, valve means controlling flow through said by-pass, and differential pressure responsive valve control means responsive to the differential between centrifugal pump pressure and fuel pump pressure, controlling opening of said valve means in proportion to said pressure differential.

7. In combination with a gas turbine engine, fuel supply control apparatus for said engine comprising substantially positive displacement fuel pump means, means forming a passage for conducting liquid fuel to said pump means for pumping of such fuel to the engine, a centrifugal pump interposed operatively in said passage for supercharging of said fuel pump means, means rotatively driven by the engine and in turn driving said pumps, and means controlled by centrifugal pump pressure operatively regulating the pressure developed by said fuel pump means substantially proportionally to the square of engine speed.

8. The control apparatus defined in claim 7, wherein the pressure developed by the centrifugal pump is a small fraction of the pressure developed by the fuel pump means.

9. Gas turbine fuel supply control apparatus comprising substantially positive displacement fuel pump means, means forming a passage for conducting liquid fuel to said pump means for pumping of such fuel to the engine, a second pump means operatively interposed in said passage for supercharging of said fuel pump means, drive means arranged to be rotatively driven by the engine and in turn driving said pumps, said second pump means producing a pressure increase substantially proportional to the square of operating speed thereof, and means responsive to pressure developed by said second pump means regulating output pressure from said fuel pump means substantially in proportion to pressure of said second pump means, whereby said fuel supply control apparatus produces output pressure as a function of speed approximating the fuel requirements of a gas turbine engine drivingly connected to said drive means.

10. The fuel supply control apparatus defined in claim 9 and spring actuated means rendering the regulating means substantially inoperative to regulate the output pressure below a predetermined engine speed, the positive displacement fuel pump means thereby producing an initial surge of fuel pressure during engine starting before said predetermined speed is reached, and means controlled by pressure of the second pump means rendering said spring actuated means substantially inoperative above said predetermined speed.

11. The fuel supply control apparatus defined in claim 9, and control means in the output of the fuel pump means variably restricting flow of fuel therefrom to the engine for regulating engine speed at a substantially constant value, said control means including a variable flow restricting valve, spring means urging said valve toward open position and pressure responsive means subjected to pressure developed by the second pump means, urging said valve toward closed position.

12. In combination, a gas turbine engine, fuel supply control apparatus comprising substantially positive displacement fuel pump means, means forming a passage for conducting liquid fuel to said pump means for pumping of such fuel to the engine, centrifugal pump means interposed operatively in said passage for supercharging said fuel pump means increasingly with speed of said centrifugal pump means, means rotatively driven by the engine and in turn driving said pumps, and means controlled in accordance with engine speed regulating output pressure of said fuel pump means substantially in proportion to the square of engine speed.

References Cited in the file of this patent

UNITED STATES PATENTS

| | | |
|---|---|---|
| 2,455,717 | Weeks | Dec. 7, 1948 |
| 2,500,227 | Adams | Mar. 14, 1950 |
| 2,619,163 | Wynne et al. | Nov. 25, 1952 |
| 2,633,830 | McCourty et al. | Apr. 7, 1953 |
| 2,642,719 | Walker | June 23, 1953 |
| 2,668,585 | Oestrich et al. | Feb. 9, 1954 |
| 2,688,925 | Thoren et al. | Sept. 14, 1954 |
| 2,713,244 | Chandler | July 19, 1955 |
| 2,756,810 | Simmons | July 31, 1956 |